US012698749B1

(12) United States Patent
Eagar et al.

(10) Patent No.: US 12,698,749 B1
(45) Date of Patent: Aug. 4, 2026

(54) MODULAR ROCKET MOTORS AND METHODS OF MAKING MODULAR ROCKET MOTORS

(71) Applicant: X-Bow Launch Systems Inc., Albuquerque, NM (US)

(72) Inventors: Mark Eagar, Cameron Park, CA (US); Bryan Beaudette, Placerville, CA (US); Andrew Sherman, Boulder, CO (US); Jeffrey Hansen, Rescue, CA (US); Andrew Max Vozoff, Boulder, CO (US)

(73) Assignee: X-Bow Launch Systems Inc., Albuquerque, NM (US)

( * ) Notice: Subject to any disclaimer, the term of this patent is extended or adjusted under 35 U.S.C. 154(b) by 0 days.

(21) Appl. No.: 18/672,927

(22) Filed: May 23, 2024

Related U.S. Application Data

(60) Provisional application No. 63/468,337, filed on May 23, 2023.

(51) Int. Cl.
| | |
|---|---|
| *F02K 9/36* | (2006.01) |
| *B29C 70/34* | (2006.01) |
| *B29C 70/54* | (2006.01) |
| *B32B 1/08* | (2006.01) |
| *B32B 3/02* | (2006.01) |
| *B32B 5/02* | (2006.01) |
| *B32B 25/04* | (2006.01) |
| *B32B 25/10* | (2006.01) |

(Continued)

(52) U.S. Cl.
CPC .............. *F02K 9/36* (2013.01); *B29C 70/342* (2013.01); *B29C 70/545* (2013.01); *B32B 1/08* (2013.01); *B32B 3/02* (2013.01); *B32B 5/02* (2013.01); *B32B 25/042* (2013.01); *B32B 25/10* (2013.01); *B32B 25/14* (2013.01); *F02K 9/32* (2013.01); *B29K 2023/16* (2013.01); *B29K 2031/00* (2013.01); *B29K 2105/0809* (2013.01); *B29K 2309/08* (2013.01); *B29K 2905/02* (2013.01); *B29L 2031/3097* (2013.01); *B32B 2260/023* (2013.01); *B32B 2260/046* (2013.01); *B32B 2262/101* (2013.01); *B32B 2605/18* (2013.01)

(58) Field of Classification Search
CPC ..... F02K 9/08; F02K 9/10; F02K 9/12; F02K 9/24; F02K 9/26; F02K 9/28; F02K 9/36; F02K 9/40
See application file for complete search history.

(56) References Cited

U.S. PATENT DOCUMENTS

| | | | | |
|---|---|---|---|---|
| 3,555,825 A | * | 1/1971 | Dilchert | F02K 9/28 |
| | | | | 60/250 |
| 4,829,765 A | * | 5/1989 | Bolieau | F42B 15/36 |
| | | | | 60/250 |

* cited by examiner

*Primary Examiner* — Gerald L Sung
(74) *Attorney, Agent, or Firm* — Temmerman Law; Mathew J. Temmerman

(57) ABSTRACT

The modular rocket motor is disclosed, featuring a cylindrical composite case with a forward end and an aft end, the latter fitted with a nozzle. The interior of the composite case houses a plurality of cartridges, each containing propellant, and retained coaxially within the case. The forward end is characterized by a forward cartridge with a radial retention interface, while the aft end includes an aft cartridge. A gas gap exists between the cartridges and the case, allowing the composite case to expand radially and axially during ignition and combustion. This design facilitates gas flow from the forward end through the gas gap towards the aft end, with the gas flow being dampened at an aft joint to ensure controlled operation of the rocket motor.

19 Claims, 3 Drawing Sheets

(51) Int. Cl.
B32B 25/14 (2006.01)
F02K 9/32 (2006.01)
B29K 23/00 (2006.01)
B29K 31/00 (2006.01)
B29K 105/08 (2006.01)
B29K 309/08 (2006.01)
B29L 31/30 (2006.01)

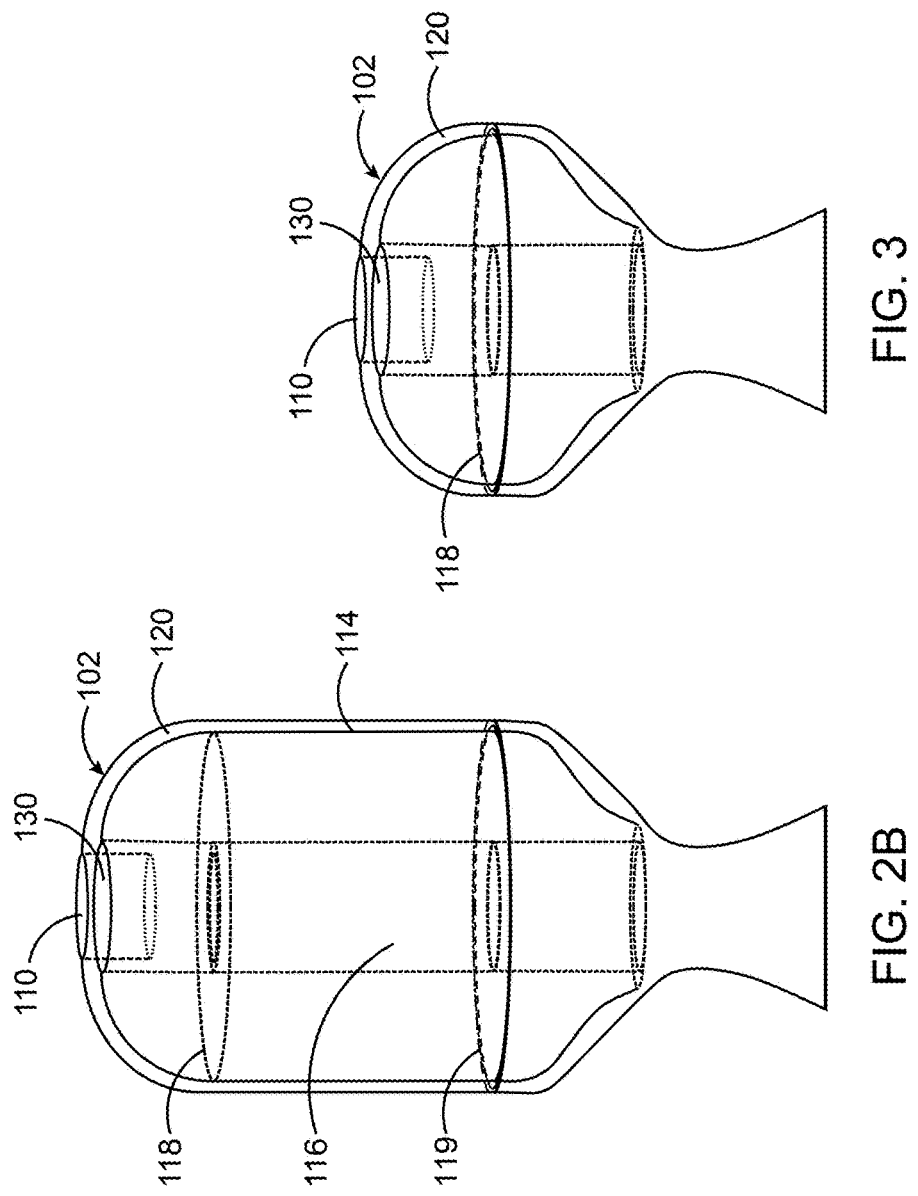
FIG. 3
FIG. 2B
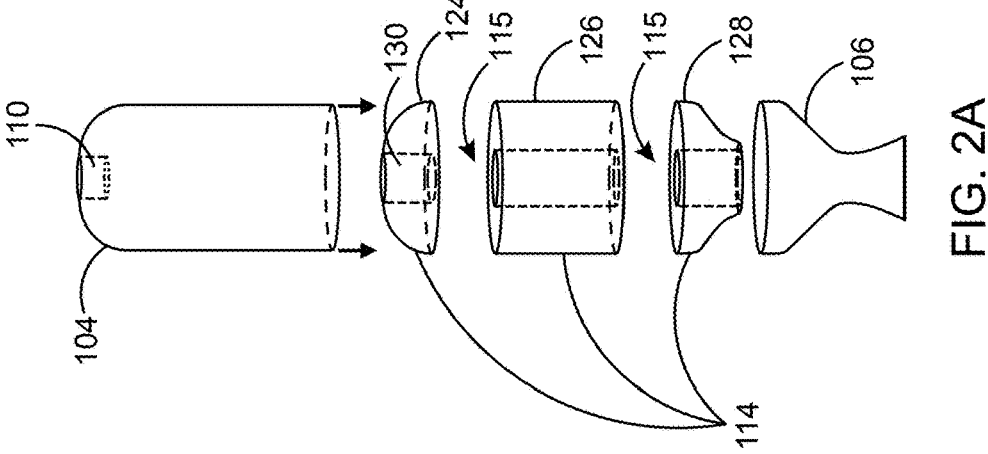
FIG. 2A

MODULAR ROCKET MOTORS AND METHODS OF MAKING MODULAR ROCKET MOTORS

RELATED APPLICATIONS

This application claims priority from the United States Provisional Application with Ser. No. 63/468,337 which was filed on May 23, 2023. The Provisional Application is hereby incorporated by reference in its entirety.

TECHNICAL FIELD

The present invention relates to modular rocket motors, methods of making modular rocket motors, automated fabrication systems, 3D-printable propulsion technologies, solid propellant materials, and methods of producing propellant elements. Specifically, the present invention relates to a method of manufacturing modular rocket motors, propellant cartridges, and radial retention interfaces.

BACKGROUND

Solid rocket motors (SRMs) are widely used in many aerospace applications, including missiles, rockets, satellites, and spacecraft. The design of an SRM usually consists of a cylindrical motor casing made of a strong and heat-resistant material such as steel, aluminum, or composite. The casing houses the solid fuel grain, which is a mixture of a fuel and an oxidizer designed to burn evenly and efficiently, producing a controlled thrust output over a specified duration. In conventional "net cast" Solid Rocket Motors (SRMs), the propellant is typically cast directly into the rocket motor casing, where it adheres to the inside of case wall. This process involves pouring or injecting the propellant mixture into the motor casing, where it then solidifies to form a solid grain. In this process, the rocket motor casing is prepared to ensure that the interior surfaces are clean and sometimes treated with a bonding agent or a release agent, depending on whether the propellant needs to strictly adhere to the casing or be removable. The propellant ingredients, including the oxidizer, fuel, binder, and any additives, are mixed together in a specific ratio to achieve the desired combustion characteristics, after which they are cast into the motor casing. This can be done through various methods, including pouring, injection, or a vacuum casting process to reduce air bubbles and ensure a dense, uniform grain. After casting, the propellant is allowed to cure and solidify. This process can take from several days to weeks, depending on the size of the motor and the type of propellant. The curing process is critical for achieving the desired mechanical properties and performance characteristics of the moto.

Unlike liquid-fueled rockets, which use liquid propellants that are pumped into a combustion chamber, SRMs have their fuel preloaded into a solid form held in the casing, making them easier to store, transport, and handle. The rate of burning (and consequently, the thrust profile) can be adjusted by varying the composition and shape of the fuel grain, allowing for precise control over the motor's performance. This is one of the key principles behind the design and operation of SRMs, allowing for a high degree of control over the motor's performance characteristics.

A conventional SRM motor is ignited via an electrically controlled igniter that ignites the solid fuel grain, initiating the combustion process. As the fuel burns, it produces a high-temperature gas that is expelled from a nozzle at the aft of the motor, generating thrust. The amount of thrust generated by an SRM is determined by the size of the motor and the composition of the fuel grain.

With respect to the composition of the fuel grain, The chemical makeup of the propellant can significantly affect its burn rate. By altering the proportions of oxidizer, fuel, and additives within the propellant mixture, engineers can control how quickly the propellant burns. Additives can include burn rate modifiers, stabilizers, and plasticizers, each serving to tailor the propellant's performance to specific requirements. The type of binder used in the propellant (the component that holds the oxidizer and fuel particles together) can also influence the burn rate. Different binders can affect the thermal properties and combustion characteristics of the propellant.

The shape of the solid propellant grain inside the rocket motor affects the surface area that is available to burn. A larger surface area results in a faster burn rate, producing more thrust, while a smaller surface area slows down the burn rate. Specific grain geometries (such as star-shaped, wagon wheel, slotted tube, or bates grain) are designed to change the burning surface area over time in a predictable manner. This allows the thrust profile of the rocket motor to be precisely engineered for different phases of flight, from initial liftoff to final burnout. Some designs aim to provide a constant thrust, while others might aim for a tailored thrust profile with varying levels of thrust throughout the burn. By manipulating these factors, engineers can design SRMs for a wide range of applications, from simple, short duration boosts to complex, multi-phase flights requiring precise thrust management.

The relative simplicity of SRMs makes them often preferred over liquid-fueled rockets. One drawback of SRMs vs liquid motors is they are less efficient, and their fuel cannot be throttled or shut off once ignited. A conventional SRM motor is ignited via an electrically controlled igniter that ignites the solid fuel grain, initiating the combustion process. As the fuel burns, it produces a high-temperature gas that is expelled from a nozzle at the aft of the motor, generating thrust. The amount of thrust generated by an SRM is determined by the size of the motor and the composition of the fuel grain.

Another drawback of SRMs vs liquid rocket motors is that "on the fly" adjustments to the burn rate are more difficult to implement. The rate of burning may be adjusted by varying the composition and shape of the fuel grain during manufacture, allowing for precise control over the motor's performance, however, making real-time adjustments during flight is not feasible. Thus, the burning rate of the propellant becomes critical is it predetermines the thrust profile of the motor in flight. By modulating the burning rate of the propellant, it is possible to control the thrust profile of the motor.

Some such SRMs have modular components, which are designed to be adaptable, with interchangeable parts or configurations that can be tailored to specific mission requirements. This approach contrasts with traditional rocket motors, which are often custom designed for a specific launch vehicle or mission profile. The modular approach offers several advantages, including reduced development time and costs, as it allows for the reuse of certain design components or the use of individual components across different missions. It also facilitates the scaling of propulsion systems for different payload capacities, improving the efficiency and flexibility of launch operations. Modular rocket motors can be used in a variety of space launch vehicles, from small satellites (CubeSats) to larger orbital and interplanetary missions. They are particularly useful in the burgeoning small satellite launch market, where flexibility and cost reduction are paramount.

A cartridge based SRM is a specific type of SRM using replaceable, pre-loaded cartridges of solid fuel to enable quick and easy assembly and disassembly. This design allows for flexibility in rocket design, as the cartridges can be replaced with different types of fuel to achieve different performance characteristics. The cartridges can also be pre-loaded and stored separately, allowing for quick assembly of rocket stages or other launch vehicles. The cartridges themselves may include a structural portion made of steel, aluminum, fiberglass or composite. They are then typically preloaded with fuel grain.

Cartridge and multi-cartridge SRMs have typically been used in compact tactical missile systems and rocket motors where they are typically "potted" to the inside of the composite case via a process of securing the solid rocket fuel cartridges or elements inside the rocket motor casing using specialized adhesive or grease. Potting ensures that the solid rocket fuel cartridges are securely mounted within the composite casing, preventing movement or vibration that could affect the rocket's performance or structural integrity during storage, handling, or flight. The potting material acts as a protective barrier, safeguarding the cartridges against environmental factors, such as moisture and temperature variations, that could potentially degrade the fuel or the interface between the fuel and the casing.

In conventional use the cartridges are loaded into a cylindrical motor casing, which houses the igniter that initiates the combustion process. As the fuel burns, it produces a high-temperature gas that is expelled out of the nozzle at the end of the motor, generating thrust.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

The present invention expands on the prior art by providing a solid rocket motor (SRM) design comprising an outer composite case comprising a plurality of floating (e.g., suspended) cartridges, wherein the cartridges or an entire stack of cartridges is allowed to "float" loosely inside the outer composite SRM case such that there is a gap of a specific size between the cartridge sleeves and an inner diameter of the outer case. The means of retention keeps the cartridge retained co-axially with the case and allows the case to swell both radially and axially during ignition and throughout the burn. The disclosure further includes the method of mounting and retaining this stack of cartridges inside the composite motor case to provide mechanical support for the cartridges and propellant under both ground handling and flight conditions.

In some embodiments, a modular rocket motor comprises a cylindrical composite case, the composite case having a forward end and an aft end, the aft end having a nozzle. In certain embodiments, a plurality of cartridges are suspended inside the composite case. In some embodiments, the cartridges house a propellant. In one example, the cartridges are retained co-axially with the composite case. In embodiments, the forward end comprises the forward cartridge, the forward cartridge comprising a radial retention interface. In some embodiments, the aft end comprises the aft cartridge. In other embodiments, a gas gap is formed between the cartridges and the case. In embodiments, the gas gap permits the composite case to swell both radially and axially during ignition and burn. In one example, gas flows from the forward, fills the gas gap, but is stagnated at the aft end to prevent recirculation of hot case, which could be detrimental to the case.

In some embodiments, the modular rocket motor comprises a radial retention interface comprising a polar boss, forward polar boss enclosure, and radial tabs. In embodiments, the radial retention interface is formed by molding the polar boss using boss molding material. In some embodiments, the polar boss is wound into the composite case, allowing the composite case to expand in response to pressure increases during ignition and burn. In one example, the polar boss is molded into at least six radial tabs. In other embodiments, the boss molding material comprises QC8700 molding compound. In embodiments, the forward cartridge comprises a composite case material. In some embodiments, the composite case material comprises vinyl ester. In one example, the polar boss is centered in the case. In other embodiments, the modular rocket motor further comprises a central joint and an aft joint. In some embodiments, the gas gap is vented to a central combustion chamber.

In some embodiments, a method of making a modular rocket motor comprises the steps of fabricating a mandrel at a cure temperature of at least 300 F; fabricating a mold for a charging gap; molding a polar boss using boss molding material with minor machining, wherein the polar boss is molded into at least six radial tabs; curing ethylene propylene diene monomer (EPDM) to the face of the polar boss to form a polar boss pre-mold; adding the polar boss to the mandrel and laying up EPDM sheets over the forward cartridge resin; laying up dry fabric over the forward cartridge resin; and applying a vacuum bag and infusing resin on the outer composite casing.

In embodiments, the method further comprises curing the case under pressure and temperature. In some embodiments, curing occurs at a temperature of at least 284 F. In other embodiments, the method further comprises trimming the closure of the case such that adjacent cartridges overlap in fitted engagement. In one example, the mold comprises aluminum. In some embodiments, the method further comprises making a plurality of holes proximate to the closure for a plurality of joints, the plurality of joints securing adjacent cartridges in fitted engagement. In one example, the plurality of joints are secured in fitted engagement with steel pins that epoxy into machined grooves of the cartridge. In other embodiments, the method further comprises adding EPDM to the closure inner diameter for an enhanced heat seal.

In some embodiments, a method of making the forward cartridge of a modular rocket motor comprises the steps of laying up fiberglass fabric sheets over uncured EPDM to form EPDM sheets; laying the EPDM sheets over a mandrel; laying fiberglass pre-preg sheets over the mandrel; curing the pre-preg sheets, wherein the pre-preg sheets are defined by a pre-preg sheet thickness; fabricating a vinyl ester forward cartridge resin using an infusion process; reinforcing the vinyl ester with QC8700 molding compound; forming a radial retention interface, wherein the radial retention interface comprises the polar boss, forward polar boss enclosure, and radial tabs; molding the polar boss using boss molding material with minor machining, wherein the polar boss is molded into at least six radial tabs; and wherein the radial tabs are located on the forward cartridge.

It is a first objective of the present invention to and allow for the reuse of engine components across different missions.

It is another object of the invention to reduce development time and costs.

It is another objective of the invention to facilitate the scaling of propulsion systems for different payload capacities, improving the efficiency and flexibility of launch operations.

It is another objective of the invention to provide adaptable, interchangeable parts or configurations that can be tailored to specific mission requirements.

Another objective of the invention is to significantly reduce complexity of propellant cast tooling and operations and deletion of strain boots during motor case fabrication by reduction of bore strain and axial strain in the cartridges.

It is another objective of the invention to enable embedded sensors to be integrated into said fuel grains to facilitate continuous modification during additive processing, or to provide a health-monitoring aspect of the SRM while transported, stored, or operated.

The disclosed system benefits from enhanced flexibility and increased ease of implementation relative to prior art systems. For example, lead-time and cost are reduced, while quality, reliability and waste mitigation are increased due to the reusability of various components. Another advantage is that ground-testing of the SRM is simplified as is commonly found in liquid rockets, thereby reducing complexity and time for test campaigns. This is an advantage that is not shared by the majority of solid rocket motors known in the art. Further, the disclosed system enables standardization, larger quantity production, and late-stage flexibility for the end user of the rocket.

These and other advantages and features of the present invention are described with specificity to make the present invention understandable to one of ordinary skill in the art.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIGS. 2A-2B show non-limiting examples of the motor case, polar boss, forward cartridge, primary cartridge, aft cartridge, polar joint, aft joint, and nozzle including an exploded view (FIG. 2A) with swappable cartridges and assembled view (FIG. 2B) with gas gap between the inside of the case and cartridge exterior;

FIG. 3 shows a non-limiting example of the motor case including the forward cartridge, aft cartridge, but no primary cartridge, including other elements.

DETAILED DESCRIPTION OF THE INVENTION

Figure 1B:
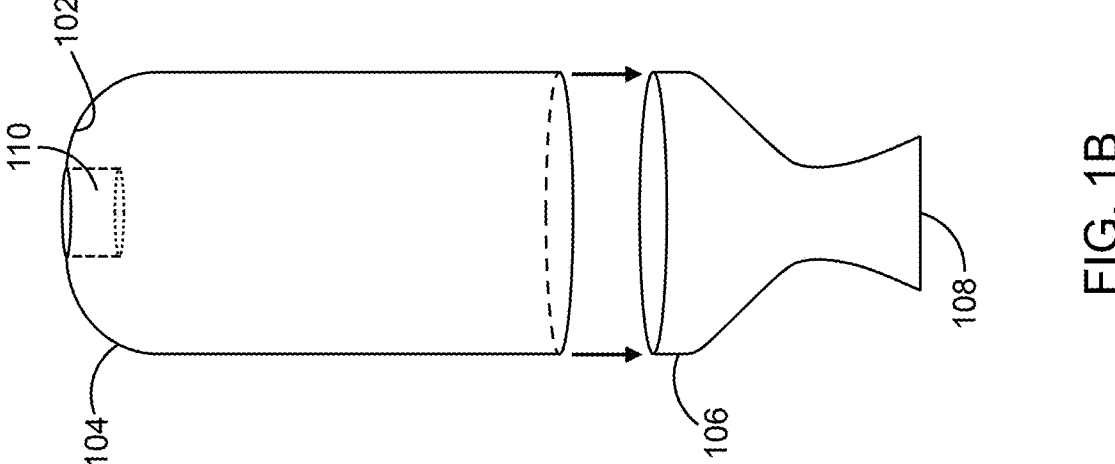
FIGS. 1A-1B show non-limiting examples of the motor case, polar boss, and nozzle in assembled (FIG. 1A) and exploded views (FIG. 1B)

The present invention is directed towards solid and hybrid-fueled rocket motors, swappable propellant cartridges, nozzles, stackable polar boss elements, and methods of production for a rocket engine. In some embodiments cartridge and multi-cartridge SRMs are disclosed, providing quick and easy assembly and disassembly. The present invention also includes an outer composite case including a plurality of floating cartridges, wherein the cartridges (also referred to herein as "propellant cartridge") or an entire stack of cartridges are allowed to "float" loosely inside the outer composite SRM case such that there is a gap of a specific size between the cartridge sleeves and the outer case. The disclosure further includes the method of mounting and retaining this stack of cartridges inside the composite motor case to provide mechanical support for the cartridges and propellant under both ground handling and flight conditions.

Further to the above, the present invention expands on the prior art by providing a solid rocket motor (SRM) 102 comprising an outer composite case 104 (also referred to herein as "outer composite SRM case", "outer case", "case", "composite motor case", "motor casing", "composite motor case", and "outer composite case") comprising a plurality of floating (e.g., suspended) cartridges, wherein the cartridges (also referred to herein as "propellant cartridge") or an entire stack of cartridges is allowed to "float" (e.g., suspended loosely) inside the outer composite SRM case 104 such that there is a gap of a specific size between the cartridge sleeves and the outer case 104. In embodiments, the means of retention keeps the cartridge retained co-axially with the case 104 and allows the case 104 to swell both radially and axially during ignition and throughout the burn. In further embodiments, the disclosure includes the method of mounting and retaining this stack of cartridges inside the composite motor case 104 to provide mechanical support for the cartridges and propellant under both ground handling and flight conditions.

In another embodiment, the motor may comprise a forward polar boss 110 centered into the multi-stack forward polar boss enclosure 130 (FIG. 2A), a plurality of cartridges and at least one joint therebetween, the cartridge and joint 115 combination including but not limited to a multi-stack forward cartridge 124 centered off and retained axially by the forward polar boss 110, at least one cartridge with joints 115 to a forward and aft cartridge, at least one cartridge with joints 115 to a forward and aft cartridge and at least one separate primary cartridge, or only forward and aft dome cartridges, but no "primary" cartridge, wherein in this embodiment the aft end of the forward dome cartridge is mounted to the aft joint 119 in place of the aft-most primary cartridge, a plurality of hot gas charging vents around the circumference of the forward polar boss 110, and a gas gap.

In one aspect of the invention, by relaxing propellant requirements (reduced stress/strain), major failure modes are eliminated, and propellant options are realized that would not otherwise be possible. In further embodiments, more cost-effective, less robust propellant formulations are utilized that maintain performance without the need for high-stress tolerance. In other aspects of the invention, the implementation of adaptive control systems manages propellant behavior dynamically, optimizing performance across varying operational conditions.

In one aspect of the invention, the system mitigates aging concerns about propellant by using a "first in, first out" approach, assigning the oldest cartridges first. In further embodiments, this strategy ensures consistent quality and performance by cycling through inventory efficiently, minimizing the risk of propellant degradation over time. Additionally, the system incorporates advanced tracking and inventory management technologies that automatically update and prioritize cartridge usage based on age and storage conditions.

In one aspect of the invention, if a flaw is found in a cartridge, only that piece needs to be replaced rather than an entire SRM (along with all the other expensive, long-lead components), which further reduces waste and, in particular, hazardous waste such as ammonium perchlorate. In further embodiments, this selective scrapping method allows for more sustainable maintenance practices, decreasing environmental impact and reducing the disposal costs associated with hazardous materials. Additionally, the disclosure contemplates systems adapted to provide early detection of flaws in cartridges.

In one aspect of the invention, the proposed system enables manufacturing optimization around cartridges rather than complete SRMs (e.g., stockpile common cartridges compatible with a range of different SRMs). If cartridges are stockpiled, then another may be swapped in. In further embodiments, this approach allows for enhanced scalability and flexibility in production, facilitating rapid assembly and deployment of SRMs. Additionally, the system ensures that inventory can be dynamically adjusted to meet varying operational demands without excessive downtime or waste.

In one aspect of the invention, the system allows for either a vertical or, in some cases, horizontal motor assembly process and tooling, which can relieve certain built facility requirements such as height. This flexibility in the assembly process may, in some cases, allow for the horizontal assembly of the rocket. In further embodiments, this adaptability in assembly orientation aids in optimizing space utilization and reducing the cost of infrastructure modifications. Additionally, the system supports modular assembly workflows, enabling quicker adaptation to different rocket designs and specifications.

In one aspect of the invention, "mixing and matching" cartridges with different propellant types, different grain shapes, and other variables enables much greater tailoring of the SRM than possible via traditional casting. This tailoring occurs only days before use. This flexibility relates to the tactical sphere and the ability to assemble a large motor 102 in the field environment. In further embodiments, the cartridge motor concept allows for separate transportation and storage of the propellant cartridge from all the inert parts of the SRM, and customization/tailoring of the SRM very late in the game (days before launch). Additionally, this modularity supports rapid deployment and adaptation to various mission requirements without the need for extensive pre-launch preparations.

In other aspects of the invention, energetic and inert components are fabricated separately, which preserves the costly inert assets should an anomalous propellant cast occur. In embodiments, separate energetic components and inert components are assembled at the launch site for improved transportation, handling, storage, and safety. Thus, as SRM manufacture, assembly, storage, and transportation/logistics are decoupled from the "energetic" material (i.e., propellant) until very late in the assembly process, near the point of use, the cost and risk for transportation and storage are greatly reduced. In other embodiments, propellant cartridges are cast or printed before the case 104 is even wound, making this a parallel process instead of serial. Furthermore, the rest of the SRM assembly and build-up is not a hazardous operation due to the absence of propellant in the case 104. Cartridge casing materials may include high-strength polymers, advanced ceramics, and alloy composites. Assembly processes may utilize robotic automation, precision alignment tools, and quick-connect fittings.

In one aspect of the invention, energetic components may include propellant formulations such as hydroxyl-terminated polybutadiene (HTPB), polybutadiene acrylic acid acrylonitrile (PBAN), and glycidyl azide polymer (GAP). In further embodiments, oxidizers like ammonium perchlorate and ammonium nitrate may be used, along with additives for burn rate modifiers, stabilizers, and plasticizers. Furthermore, igniters and ignition compounds such as boron-potassium nitrate may be used. In other embodiments, the inert components may include structural casings made from carbon fiber composites or advanced alloys like titanium and aluminum. Additionally, insulation liners typically use phenolic resin or silicone-based materials. In other aspects of the invention, nozzle 108 assemblies include throat inserts made from graphite or advanced ceramics. In some embodiments, connective hardware includes high-strength steel or aluminum bolts, nuts, and washers.

In embodiments, the cartridge SRM concept protects most of the internal surface area of the composite SRM case 104 from the intense heat of a motor burn. Specifically, the protection is due to presence of the cartridge sleeves, the rapidly-cooling gas gap, and pyrophoric materials that effectively cool the case 104 as they ablate. As a result, the case 104 requires relatively little insulation compared to more traditional SRMs.

Forward Cartridge Centering Off Igniter Housing/Polar Boss

In some embodiments, a means of mechanically retaining the forward end of the motor (e.g., the forward end of a stack of propellant cartridges) inside a solid rocket motor 102 (SRM) is disclosed. In this configuration, the aft end of the motor is mechanically mounted to the aft closure 106, while the top of the cartridge stack is retained radially by a structure at the top of the composite case 104. In embodiments, as shown in FIG. 2, the top of the cartridge stack comprises the polar boss 110. extended into the forward polar boss enclosure 130 and the forward cartridge 124. This arrangement ensures that the top of the stack remains centered from the motor assembly stage through transport, rail integration, and flight. The cartridge stack is constrained minimally by the case polar boss inner diameter, which maintains its position while allowing for case 104 flexing, growth, and compression, such as growth during ignition pressurization.

Figure 1A:
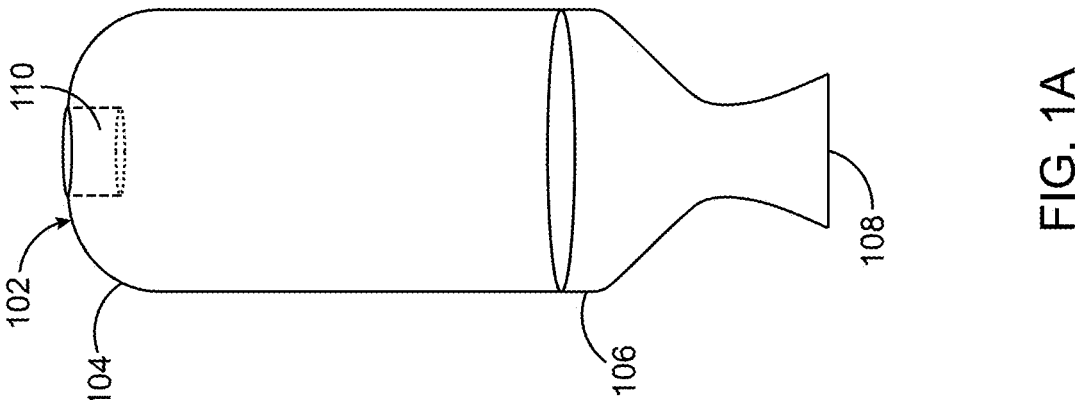

In embodiments, FIGS. 1A-1B show non-limiting examples of the motor case 104, polar boss 110, closure 106 and nozzle 108 in assembled (FIG. 1A) and exploded views. FIGS. 2A-2B show non-limiting examples of the motor case 104, polar boss 110, forward cartridge 124, primary cartridge 126, aft cartridge 128, polar joint 118, aft joint 119, and closure 106 (also referred to herein as "aft closure"), and nozzle 108, including an exploded view (FIG. 2A) with swappable cartridges and assembled view (FIG. 2B) with gas gap 120 between the inside of the case and cartridge exterior 114.

In another aspect of the invention, the case polar boss inner diameter containing the igniter 132 is wound into the composite case 104 and extends down into the core perforation of the top propellant cartridge. More specifically, and in the preferred embodiment, the forward polar boss of the case polar boss inner diameter is wound into the composite case 104 and extends into the core perforation at the top propellant cartridge. This structural relationship facilitates centering and axial load transfer to the launch vehicle during acceleration and allows the composite outer case 104 to expand in response to pressure increases. Furthermore, this configuration aids in the thermal management of the gas between the inner cartridge stack and the outer composite case 104 by stagnating the gas at the aft end of this gap, which helps prevent recirculation.

In some embodiments, if this stack of propellant cartridges is retained at the aft end, the stack is effectively cantilevered on the aft joint 119, requiring thousands of pounds of propellant and cartridge sleeves to provide sufficient stiffness to avoid flexing and hitting the inside of the composite case 104 near the top of the stack. This unwanted excessive movement would be particularly detrimental during horizontal ground operations such as transport to the launch rail or on the rail before it is raised into the launch position. In embodiments, off-axis flexing during flight is controlled in this manner as these vehicles are often spin-stabilized and shifting of this considerable mass (majority of the motor/stage mass) off-axis could lead to instability and vehicle failure. Alternative configurations may include multiple retention points along the length of the cartridge stack or the use of flexible yet supportive materials within the stack to distribute stresses and reduce the risk of off-axis shifts during operation. FIG. 3 shows an example of the motor case including the forward cartridge, aft cartridge, but no primary cartridge.

Figures 4A, 4B:
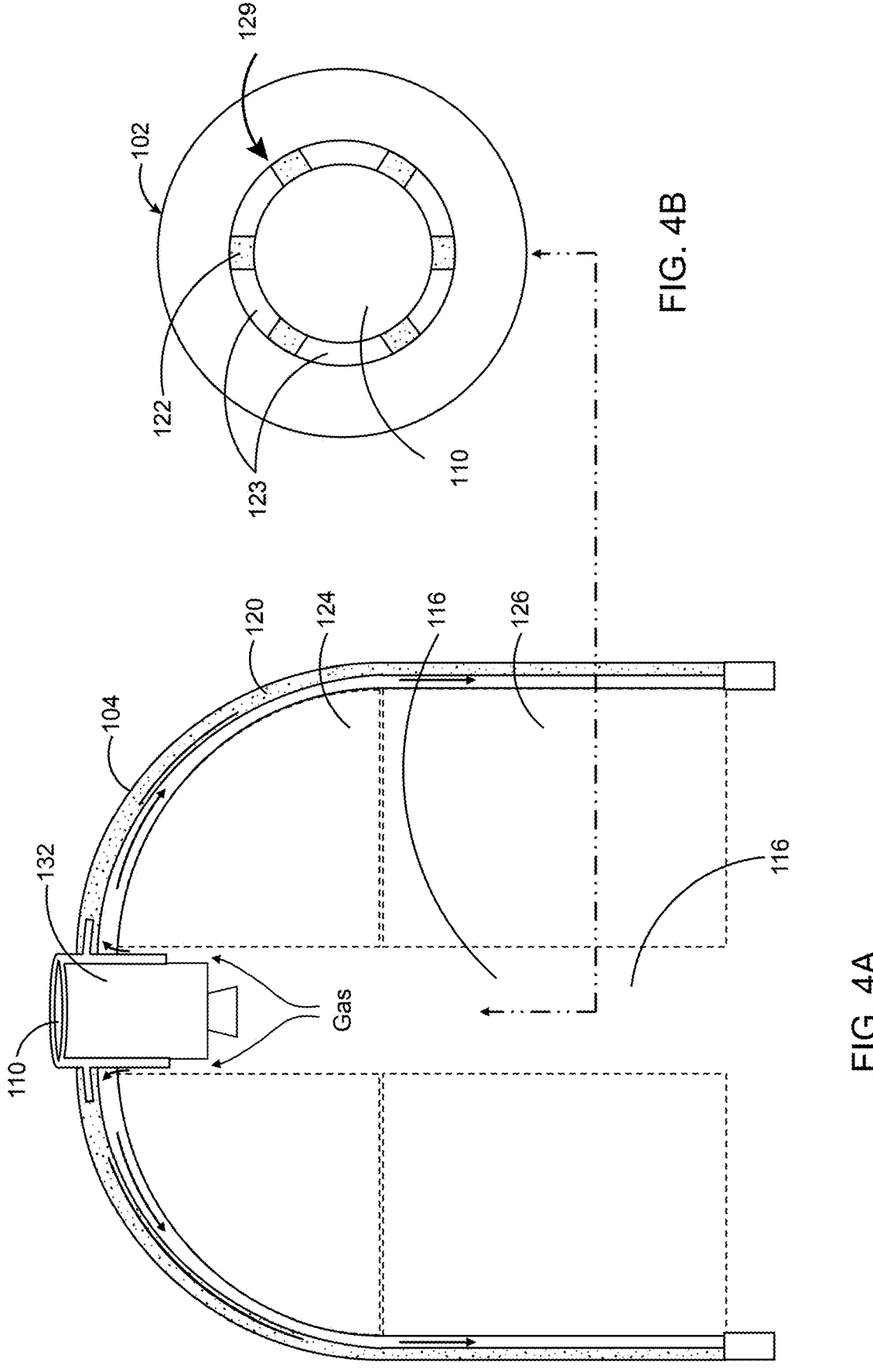
FIG. 4A-4B show non-limiting examples of the case, gas path, polar boss, and other elements in a side view (FIG. 4A) and a top-down view (FIG. 4B) showing the case, charging gaps, polar boss, and other elements.

FIG. 4A-4B show non-limiting examples of the case 104, gas path, polar boss 110, and other elements in a side view (FIG. 4A) and a bottom up view (FIG. 4B) showing the cartridge 102, charging gaps 123, polar boss 110, radial tabs 122 (also referred to herein as the "radial retention tabs" or "tabs"), propellant 124, and other elements. In a preferred embodiment, a radial retention interface comprises radial tabs 122, wherein in a preferred embodiment there are at least six radial tabs 122 located on the dome cartridge interface with the polar boss, resulting in a net molded "boss". In other embodiments, any number of a plurality of radial tabs are provided. As described herein, in some embodiments the radial retention interface 129 comprises a forward polar boss enclosure 130, polar boss 110, and radial tabs 122. In embodiments, the radial retention interface 129 is formed by molding a polar boss using boss molding material (e.g., QC8700 molding compound, carbon fiber reinforced polymer (CFRP), silicon carbide (SiC), ceramic matrix composites (CMC), polyether ether ketone (PEEK), titanium alloys, Inconel alloys, phenolic resin composites, fiberglass, high-density polyethylene (HDPE), and aluminum alloys) with minor machining to form the boss structure, wherein the polar boss is molded into at least six radial tabs. In other embodiments the polar boss is molded into at least 7, 8, 9, or 10 radial tabs. In other embodiments the polar boss is molded into 3, 4, 5, 6, 7, 8, 9, 10, 11, 12, 13, or 14 radial tabs.

In one aspect of the invention, the polar boss 110 must fit in loosely enough for easy assembly of case 104 but be snug enough to accommodate radial loads transferred from the top of the cartridge stack when forces urge it to move off-axis. In further embodiments, the polar boss 110 is sized for fitment before, during, and after ignition, in an embodiment comprising the extended composite case 104, the extended composite case 104 comprising an outer composite case that has extended considerably in diameter and length. In other embodiments, the polar boss 110 extends deeply enough into the perforation that it still retains the stack after ignition, at which time the extended composite case 104 may be several inches longer than prior to ignition. In embodiments, the extended composite case 104 comprises an aft joint 119, polar joint 118, and central joint 201. In some embodiments, because this polar joint 118 is the only path for hot combustion gases to fill (or "charge") the gas gap between the cartridges and the outer composite case 104, the polar boss 110 must allow adequate flow of hot gases into the rapidly expanding gas-gap between the cartridges and the case 104 during the ignition event. In other aspects of the invention, said embodiment applies to cartridge SRMs with loose fitting cartridges with a gap between the cartridge sleeves and the outer composite case 104.

In other embodiments, alternative polar boss materials are contemplated that adjust thermal expansion properties to better match the changes in the outer composite case 104, enhancing the fit and performance throughout the operation of the motor 102. Said alternative polar boss materials may include, but are not limited to, Inconel (various grades), Titanium alloys, High-temperature stainless steels (e.g., 310, 316), Nickel-chromium alloys, Ceramic composites, Carbon-carbon composites, Silicon carbide (SiC), Zirconium diboride (ZrB2), Tungsten alloys, Molybdenum alloys, and Aluminum oxide (Alumina). Grades of Inconel may include Inconel 600, Inconel 625, Inconel 718, Inconel X-750, Inconel 725, Inconel 601, Inconel 617, Inconel 690, Inconel 713C, Inconel 738, and Inconel 939.

In another embodiment, the SRM includes a cost saving feature whereby the inner diameter (ID) of the composite case 104 is kept constant, and the outer diameter (OD) is increased where necessary to facilitate joint 115 design. Notably, this allows the composite case filament wind to use a simple cylindrical mandrel instead of a more complex shape typically used to vary the ID and keep the OD constant. In embodiments, this allows a single long mandrel to be used for a range of different case/motor lengths, instead of making a new mandrel for each design. Potential materials for the mandrel include: steel grades 1018, 1045, 4140, 4340; aluminum alloys 6061, 7075; titanium alloys Grade 5, Grade 23; nickel alloys such as Inconel 625, Inconel 718; and composite materials like carbon fiber reinforced polymer (CFRP) and glass fiber reinforced polymer (GFRP).

Primary Cartridges and Cartridge Joints

In some embodiments, multi-cartridge stacks provide a means for joining cartridges together to ensure structural integrity, proper alignment, and consistent performance throughout the operation of the motor 102. In embodiments, said joints 115 may be disposed between identical cylindrical cartridges or between a cylindrical cartridge and a domed cartridge at the top of the stack or the aft cartridge at the rear of the stack. Joints 115 between cartridges serve critical purposes, including maintaining the alignment of the fuel grains, ensuring the continuity of the burn, and transferring mechanical loads and handling the stresses and thermal expansion experienced during ignition and burn while preventing undesirable gas penetration. In embodiments, joint materials are included to line the joints 115, said joint materials include aerospace-grade adhesives such as epoxy resins; mechanical fasteners like titanium bolts; welding methods using Inconel 625 or Inconel 718; and advanced sealing technologies like flexible graphite or PTFE (polytetrafluoroethylene) gaskets.

In some embodiments, there are several types of joints 115, the type depending on whether they are between identical cylindrical cartridges, between a cylindrical cartridge and a domed cartridge at the top of the stack or the aft cartridge at the rear of the stack. In other embodiments, the joint between the forward cartridge 124, primary cartridge 126, and aft cartridge 128 must accommodate the different shapes while ensuring a secure connection. Furthermore, the aft-most cartridge closure/cartridge joint is preferably mechanically mounted to the aft closure, may incorporate or interface with the nozzle 108 (also referred to herein as "nozzle assembly"), and preferably be tolerant of higher temperatures and stresses associated with this location. Joint materials may include high-temperature resistant adhesives such as ceramic-based adhesives; mechanical fastening systems such as high-strength alloy bolts, grades including A-286, MP35N, Inconel 718; or thermal expansion accommodating interfaces such as Invar 36 or Kovar to mitigate differential thermal expansion.

In one aspect of the invention, the cartridge sleeve is a cylindrical tube made of a composite material, such as fiberglass or carbon phenolic. In further embodiments, construction materials maintain an enhanced tolerance to high temperatures and pressures while maintaining strength and durability. Typically, the sleeve is placed inside the motor casing and serves as a liner for the solid fuel grain, helping insulate the casing from the heat. In other embodiments, they must effectively seal the interface between cartridges to prevent hot gases from escaping, and typically are designed to transfer loads (both axial and radial) effectively across the stack under flight conditions (often 5G or greater acceleration) without causing deformation or failure of the cartridges. In some embodiments, for designs prioritizing modularity, joint construction prioritizes easy assembly and disassembly while maintaining performance standards. In embodiments, mechanical fastening systems may include bolted flanges or snap-fit joints 115, adhesives that can be reliably bonded and debonded like thermally reversible adhesives, or locking mechanisms such as twist-lock or bayonet fittings.

In one aspect of the invention, specific to the aft-most cartridge, this is mechanically mounted to the top of the aft closure (the steel dome or cone section that includes the SRM throat and nozzle 108). Furthermore, this joint is accomplished using a combination of pins and adhesive or adhesive alone. In further embodiments, the joint accepts the aft end of the cartridge stack, with all associated structural loads of the cartridges, with their respective propellant loads (potentially thousands of pounds each), under flight conditions. Additionally, the joint further accepts the composite SRM case around the outside of the cartridge, with all associated structural loads of the forward-portion of the booster stack and payload. In other embodiments, the aft-most cartridge will also stagnate the aft end of the gas-gap (between the cartridges and the SRM case) and not allow gas to escape or recirculate. Moreover, the cartridge allows for disassembly of the SRM case for post-test inspection, forensics, and potential reassembly and re-test/flight. Enhancements include using advanced pin materials such as titanium alloys or nickel-based superalloys, and adhesive types could involve high-temperature capable epoxies or polyimides, providing increased reliability and thermal stability under extreme conditions.

In one aspect of the invention, the cartridges provide sufficient structural stiffness to support the cartridge stack under ground handling conditions including horizontal transportation and launch rail upload without allowing sagging into the SRM case. In further embodiments, the cartridges may incorporate internal cross-bracing structures or external harnesses to enhance rigidity and prevent deformation during transport. Additionally, the use of composite materials with increased modulus of elasticity, such as high-strength carbon fiber or glass fiber reinforced polymers, could be implemented to provide the required stiffness. Furthermore, modular cartridge designs could include interlocking features that increase structural integrity when assembled, ensuring stability during handling and load transfer events.

Hot gas charging gaps 123 are also disposed around the circumference of the forward polar boss 110. In one aspect of the invention, the polar boss 110 of the system is the protruding axial circular feature on the inner surface of the rocket motor case near the forward end at the polar axis of the rocket motor 102. The purpose of these elements is to provide structural support to the front end of the propellant cartridge stack, which helps to prevent bending and deformation of the cartridges during the high-pressure, high-temperature combustion of the rocket propellant. In embodiments, the cartridges house a propellant. The material composition of the polar boss 110 may include specialized high-temperature alloys such as Inconel 740 or Haynes 282, which offer superior creep resistance at the temperatures encountered during rocket motor 102 operations. Additionally, in one embodiment vibration damping materials around the polar boss 110 further stabilizes the cartridge stack against dynamic loads experienced during launch. Additionally, given its positioning inside the cartridge, the polar boss 110 serves as a means of igniting the rocket motor 102 as shown in FIG. 1A and FIG. 1B.

In some embodiments, a small hole or cavity is drilled into the center of the polar boss 110 (also referred to herein as "boss"), which serves as a channel for the initial ignition of the rocket motor 102. In some embodiments, the shape or size of this ignition channel is modified to optimize the ignition sequence, improving the motor's start-up reliability and performance. In embodiments, laser sintering is used to manufacture the polar boss 110 to allow for more precise geometric configurations, enhancing the igniter's effectiveness and overall motor efficiency.

In one aspect of the invention, as shown in FIG. 4A and FIG. 4B, the gap is vented to the central combustion chamber 116, allowing it to fill with pressurized gas during ignition of the SRM and achieving zero net pressure across the propellant grain. In other embodiments, the system incorporates an adjustable venting mechanism, to precisely control the gas flow into the gap, optimizing the pressure balance during the critical ignition phase. Further, sensors are integrated within the gap, providing real-time monitoring of pressure variations, assisting in the dynamic adjustment of the venting mechanism to maintain optimal conditions throughout the burn.

In one aspect of the invention, the polar boss retention scheme provides a controlled gas path into the gap that allows the pressures to quickly equalize upon ignition. Alternative embodiments of the gas path includes designs with helical channels to create a vortex effect for faster mixing, linear diffusers to evenly distribute gas across the cartridge interface, and segmented pathways that can be individually adjusted to control the rate of gas flow and pressure equalization. In further embodiments, this equalization facilitates operation of the floating/suspended multi-cartridge design. Additionally, the use of electronically controlled gas path valves that adjust based on real-time sensor data further enhance the precision of pressure management within the system.

In one aspect of the invention, the gas path is positioned such that aluminum slag is not permitted to enter the gap where it may exacerbate thermal erosion of the case insulation, potentially leading to failure. In other embodiments, the polar boss 110 prevents this as it is axial (not circumferential) and forward of slag creation and flow. In some embodiments, the gas path includes slag deflectors specifically shaped to divert particulate matter away from critical areas. Further, the polar boss 110 may be equipped with a cooling system that uses a fluid flow to reduce the temperature at critical points, minimizing the risk of thermal erosion. Additionally, embodiments may include slag deflectors or barriers integrated within the polar boss 110 structure to further protect against slag intrusion, thereby enhancing the durability and operational safety of the system. These barriers may be made from heat-resistant materials such as ceramic composites or advanced alloys to withstand extreme conditions.

In one aspect of the invention, thermal mitigation features, such as but not limited to the use of pyrophoric materials, are operably oriented proximate to the joint to minimize thermal damage and charring as the hot gas enters. In further embodiments, said pyrophoric materials comprise ablation composites that ablate at controlled rates to provide consistent cooling effects. Furthermore, pyrophoric materials cool the case as they ablate, thereby mitigating thermal damage during SRM firing. In other embodiments, a layering approach is utilized wherein materials with different ablation rates are operably oriented to optimize thermal protection throughout the burn cycle.

In some embodiments, gas charging recirculation is addressed by the incorporation of one-way vents that stop recirculation or filters that impede recirculation. In other aspects of the invention, the one-way vents include an automatic closure feature that reacts to specific pressure thresholds, ensuring optimal operational efficiency. Additionally, the filters employ materials that withstand high temperatures and corrosive gases, extending the lifespan and reliability of the system.

Manufacturing Processes

The following details preferred embodiments of the forward cartridge 124 (also referred to as the forward propellant dome), including disclosure related to insulation, dome material, dome resin (also referred to herein as "forward cartridge resin"), and other elements. Said embodiments include: 1. ID (inner diameter) insulation-EPDM-24 or 0.30 thickness in a preferred embodiment., 2. Dome material—Fiberglass fabric sheets are laid over uncured EPDM in a preferred embodiment. In this embodiment, EPDM sheets are laid over a mandrel, followed by fiberglass pre-preg sheets, and then they are cured afterwards. In a preferred embodiment, the resulting thickness is about 0.15 inches. In other embodiments, sheet thickness, is about 0.10 inches, 0.20 inches, or 0.25 inches., 3. Forward cartridge resin—In a preferred embodiment, the forward cartridge resin of the forward propellant dome comprises a composite case material including vinyl ester in a preferred embodiment. Said vinyl ester is manufactured using an infusion process., 4. Radial retention interface, radial tabs on the dome cartridge interface with the polar boss, resulting in a net molded "boss" with six integral radial retention tabs. In embodiments, QC8700 molding compound is used for the molded boss. In other embodiments, the same QC8700 is used for an igniter nozzle.

Further to the above, embodiments for manufacturing of the forward cartridge further include: 5. Forward cartridge retained by polar boss 110—In some embodiments, radial tabs are located on the dome cartridge as shown in FIG. 4B., 6. In embodiments, the charging gap area at boss is approximately 8 in 2 and is in-line with a chamber pressure transducer port., 7. In embodiments, the radial tab clearance to igniter EPDM is nominally 0.075 inch diameter or 0.037 inch radial gap "rattle space". In embodiments, this radial gap is less than 0.037 inches (e.g., 0.020 inches or less). In addition, the igniter needs room for installation and to support transportation loads, lateral Gs etc. In other embodiments, the EPDM ID is tapered. Said dimensions extend from about 0.35 inches at the QC boss and taper to 0.20 inches or 0.24 inches at the aft edge which could allow for more duration and insulation exposure at the smaller radii and thinner under the receding propellant., 8. In embodiments, the initial axial standoff separation of propellant dome boss to case EPDM is 0.75 inches or less at boss, tapering to 0.080 inches radial clearance at the interface with the cylinder cartridge which is the current case ID to cartridge OD radial clearance. In other embodiments, said gap is smaller than 0.75 inches. In embodiments, the larger the total volume, the more heat that must be sucked out of the stagnant gas. In embodiments, a user may chamfer the boss face ID so as to not interfere with the EPDM., and 9. In embodiments, attachment to main propellant cartridge OD machined area is formed with 20-24 steel pins, 0.25 inches in diameter, embedded in the epoxy-filled groove in the cylinder cartridge. In embodiments, the forward machined area does not have any holes pre-machined. In embodiments, a user can match drill or fixture drill through-holes, though the epoxy joint with the increased pin quantity is sufficient for the purpose of initial ground tests. In some embodiments the pins may be deleted, and the joint designed with epoxy retention only using sufficient bond shear area.

The following steps provide an exemplary manufacturing process for making a modular rocket motor cartridge including fabrication of the male mandrel, mold up of the boss, layup of dry fabric over the dome, and other steps. Said exemplary manufacturing process includes: 1. Fabricate male mandrel—In embodiments, hard plastic comprising the outer casing may be used if said hard plastic is adapted to withstand the cure temp of 320 F or more. In a preferred embodiment, aluminum may be used to fabricate the male mandrel. In other embodiments, cure temperatures may include at least 300 F, 300 F, at least 310 F, 310 F, at least 315 F, 315 F, at least 320 F, 320 F, least 325 F, 325 F, at least 330F, 330 F, or at least 340 F, 2. Fabricate mold for the charging gap (also referred to herein as, "combination polar boss-gas passage", "combination boss-charge passage" or "polar boss-gas passage")—In a preferred embodiment, said mold is fabricated from aluminum. In other embodiments, the mold may be fabricated from steel, stainless steel, silicone, brass, polyurethane, carbon fiber, titanium, or a combination of any of said materials, 3. Mold up the boss—In a preferred embodiment QC8700 molding compound is used in the mold up of the boss with minor machining.

Further to the above, embodiments for manufacturing a modular rocket motor cartridge include: 4. Add and cure ethylene propylene diene monomer (EPDM) (add small amount to boss face) to complete the polar boss pre-mold, 5. Add boss to mandrel and layup EPDM sheets over dome, 6. Layup dry fabric over dome, 7. Applying a vacuum bag and infusing resin on outer composite casing. This embodiment benefits from a decreased expense relative to comparable systems known in the art, 8. Cure the outer composite casing under pressure and temperature. Cure temperatures may include at least 300 F, at least 310 F, at least 315 F, at least 320 F, least 325 F, at least 330 F, or at least 340 F, 9. Machine aft cut-off to length—in the case of the cylinder cartridge this step involves cutting off the closure to desired length, 10. Machine a plurality of holes (e.g., 20 to 24 holes) in aft mating area for steel pins that will epoxy into the machined groove in existing propellant cartridge. In embodiments, a small drill ring tool is used for this step. In other words, a plurality of holes are made in the closure mating area for the plurality of cartridge joints that join the plurality of suspended cartridges, 11. Add and bond small wedge of cured EPDM to aft inner diameter for an improved heat seal for bonded and pinned joint area. In other words, EPDM is added to the closure inner diameter for an improved heat seal for the bonded joint area.

Regarding step 1, a range of pressures and temperatures can be applied depending on the specific materials used and the desired properties of the final product. In a preferred embodiment, cure temperatures may include at least 300 F, 300 F, at least 310 F, 310 F, at least 315 F, 315 F, at least 320 F, 320 F, least 325 F, 325 F, at least 330 F, 330 F, or at least 340 F. In some embodiments, the curing process may occur at temperatures ranging from 248 F to 482 F. In embodiments, pressures during the curing process may vary from 2 bar (about 29 psi) to 7 bar (about 102 psi), which helps to compact the material and reduce voids, enhancing the mechanical strength and thermal stability of the cartridge, and in particular the dome.

In other embodiments, epoxies with resistance temperatures over 600 F and/or up to 662 F may be used, especially when high-performance materials such as polyimides or bismaleimides are involved. In one example, lower pressures such as 1 bar (about 14.5 psi) to 5 bar (about 72.5 psi) are adequate for certain epoxy-based composites. For example, more extreme conditions may apply pressures ranging from 3 bar (about 43.5 psi) to 10 bar (about 145 psi), which are suitable for manufacturing processes requiring denser and more robust composite structures. In some embodiments, specific segments of the curing cycle might employ progressively increasing temperatures and pressures to optimize the cross-linking of polymer chains and minimize residual stresses within the composite material.

Regarding the forward cartridge resin, alternative embodiments of the composite case material include epoxy, which provides enhance mechanical strength and durability. In other embodiments, composite case material comprises polyester resin such as phenolic resin, bismaleimide, polyurethane, silicone resin, polyimide, acrylic resin, or melamine resin.

Gas Gap Charging Modeling and Design Processes

In embodiments, gas flow and pressure profiles in the gas gap are carefully routed in this cartridge SRM design, as shown in the FIG. 2B, FIG. 4A, and FIG. 4B. In other aspects of the invention, this routing incorporates routing channels that ensure efficient distribution and dissipation of gas pressures. In other embodiments, the gas cap significantly reduces mechanical strain on the case, the propellant, and other components, facilitating the reuse of the SRM components. Further, the system includes modular components adapted for easy replacement, enhancing adaptability and facilitating quicker refurbishment and reuse.

FIG. 4A and FIG. 4B show that the gap is vented to the central combustion chamber to allow the gap to fill with pressurized gas during ignition of the SRM, resulting in zero net pressure across the propellant grain (e.g., pressure is the same on the outside of the cartridge as on the inside). In other embodiments, the venting system includes adjustable pressure regulators that ensure consistent pressure equalization, regardless of variations in ignition conditions. Said pressure regulators reduce structural stress and deformation of the cartridge, thereby enhancing the structural integrity and longevity of the SRM components. Additionally, computational fluid dynamics (CFD) modeling is utilized to optimize the design of the vent paths, ensuring maximum efficiency and reliability in gas distribution.

This approach removes some of the most stressing and difficult-to-meet requirements on the propellant itself as the SRM case changes in size during ignition. However, the propellant does not have to follow because it is mechanically decoupled from the case. In further embodiments, materials used for decoupling include silicon-infused carbon fibers, advanced ceramic composites, each selected for their high elasticity and temperature resilience. For example, specialized joint designs may incorporate flexible, heat-resistant seals, elastic mechanical couplings that maintain integrity despite differential movement and thermal expansion. In other aspects of the invention, gap monitoring systems may be integrated into the gap to continuously assess the mechanical status, the thermal status of the decoupling points, ensuring operational safety and effectiveness.

In one aspect of the invention, the SRM design ensures that after the initial inrush of gas during ignition, the gas in the gap stagnates and is not allowed to circulate. This dramatically limits thermal challenges, allowing for minimal insulation in this region. In other embodiments, the system incorporates advanced materials such as aerogels or phase change materials within this minimal insulation to enhance thermal protection without significant bulk. Furthermore, heat shields integrated directly adjacent to the gap may utilize reflective coatings or high emissivity surfaces to further mitigate heat transfer. In one example, post-test inspection of Applicant's 32" case revealed a lack of charring on the insulation, to the point that the test system could reuse this case with little rework required. This raises the potential of testing an SRM on the ground in a static test, then reusing that case on a subsequent test or even a flight. This approaches one of the discriminating benefits of liquid rockets over solids, in that they can be test-fired on the ground before committing to flight, which reduces risk and increases cost margin. Relatedly, the prior art to date has not shown the reusability of a composite SRM case as a flight unit.

Further to the above, in an exemplary embodiment, the system may comprise a polar boss 110 centered in the case 104, a plurality of cartridges and at least one joint therebetween, the cartridge and joint 115 combination including but not limited to a forward cartridge 124 centered off and retained axially by the polar boss 110. Said embodiment also includes at least one cartridge with joints 115 to a forward and aft cartridge 128, at least one cartridge with joints 115 to a forward and aft cartridge 128 and a separate primary cartridge 126. The above embodiments also include a plurality of hot gas charging vents 123 (also referred to herein as "combination boss-charge passage") around the circumference of the polar boss 110 (also referred to herein as "forward polar boss), and a gas gap 120.

FIG. 3 shows another embodiment including a forward cartridge 124 and aft cartridge 128, but no "primary" cartridge, wherein in this embodiment the aft end of the forward cartridge (also referred to as a "forward dome cartridge", or "dome") is mounted to an aft closure in place of the aft-most primary cartridge. The above embodiment also include a plurality of hot gas charging vents around the circumference of the forward polar boss 110, and a gas gap. The following parameters may be customized while still maintaining a standardized production capability: The number of cartridges in the motor 102, whether forward and aft dome cartridges are included (one, both, or neither), swappable after closures, selectable aft closures, and nozzle 108 (e.g., slag shed, elliptical or vectorable). In addition to the cartridges, other parts of the SRM are also standardized and selectable: Aft closures, aft nozzles 108 (slag shed, elliptical or vectorable), scalable modularized igniter, and case winding mandrel (allowing selectable case length).

Winding Mandrels

In an exemplary embodiment, the system includes a case winding mandrel for manufacturing solid rocket motor (SRM) casings. In embodiments, the mandrel serves as a form around which materials (e.g., composites), are wound to define the rocket casing's internal diameter and structural integrity. The disclosed case winding mandrels are made from materials capable of withstanding significant mechanical stresses and high temperatures. In embodiments, the case winding mandrel adaptable to meet well-defined dimensional and tolerance requirements, providing enhanced SRM functionality and safety.

In further embodiments, the case winding mandrel supports the modularity in SRM constructions disclosed herein. This feature allows it to accommodate various sections of the case 104, enabling assembly configurations that can vary in length and diameter based on specific mission requirements. As such, this modularity provides customized rocket performance and payload capabilities, permitting tailored solutions to specific aerospace needs. In certain embodiments, the case winding mandrels support production of a case comprising one, two, three, or more than three primary cartridges, providing a modular solid rocket motor (SRMs). In some embodiments, six cylindrical cartridges and a dome and aft cartridge for a total of eight are provided. The case mandrel is structured to ensure precise alignment and secure attachment of these cartridges, providing enhanced structural integrity and performance consistency of the SRM. The mandrel's design facilitates the winding of composite materials that form the external casing, effectively surrounding and protecting the internal cartridges.

In further embodiments, the modularity allows swappable segments that can be reconfigured to support different configurations of primary cartridges 126. For example, one embodiment allows for a linear arrangement of the cartridges, optimizing the internal volume and enhancing the motor's thrust capabilities. In one embodiments, this configuration leverages modular composite materials carbon fiber reinforced polymer (CFRP), glass fiber reinforced polymer (GFRP), aramid fiber composites, boron-reinforced composites, ceramic matrix composites (CMC), high-temperature thermoplastic composites, basalt fiber composites, silicon carbide fiber reinforced composites, polyether ether ketone (PEEK) composites, and ultra-high molecular weight polyethylene (UHMWPE) composites) that not only serve as the structural framework but also integrate with solid SRM fuel technologies to improve performance.

In another example, the cartridge mandrel design focuses on modular interchangeability, wherein the mandrel can accommodate various types of primary cartridges with different fuel compositions and sizes. This flexibility is achieved through a universal docking system on the mandrel, which features standardized attachment points that are compatible with multiple cartridge designs. This system not only simplifies the assembly process but also enhances the SRM's adaptability to different mission requirements, allowing for quick adjustments and optimizations based on specific payload and performance needs. In further embodiments, the mandrel incorporates advanced modular materials that withstand high temperatures and mechanical stresses while maintaining precise alignment and connectivity of the cartridges. This ensures that the SRM can operate reliably in various environmental conditions, providing a scalable and flexible design for solid rocket motors.

Swappable and Selectable Aft Closures

In embodiments, the system includes swappable/selectable aft closures that enhance the versatility and adaptability of solid rocket motors (SRMs). These closures are designed to be interchangeable, allowing for customization based on specific mission requirements and performance characteristics. Each closure option can affect the motor's exhaust flow, impacting thrust and efficiency. The design allows for easy replacement and adjustment, permitting rapid reconfiguration between missions or in response to changing operational needs.

In further embodiments, the selectable aft closures come in various designs such as slag shed, elliptical, and vectorable nozzles. For example, slag shed nozzles are ideal for missions requiring high heat resistance and durability, minimizing the accumulation of slag and other combustion residues. Elliptical nozzles, on the other hand, are suited for missions that require precise control over thrust vectoring and are particularly beneficial in orbital adjustments and satellite positioning.

In one example, vectorable aft closures offer dynamic steering capabilities that enhance the maneuverability of the rocket during flight. This type of nozzle can pivot, allowing for real-time trajectory adjustments, which is critical for missions with complex flight paths or where mid-course corrections are necessary. The use of vectorable nozzles significantly increases a rocket's flexibility in responding to in-flight variables and target alterations.

In one example, the integration of advanced materials in the construction of these aft closures-such as high-temperature alloys and ceramic matrix composites—ensures their performance under extreme conditions. This not only extends the life of the closures but also ensures reliability across a broad range of operating environments. These materials provide the necessary resistance to thermal and mechanical stress, which is essential for maintaining the integrity of the rocket motor's aft section during high-speed and high-temperature operations.

Nozzles

In embodiments, nozzles 106 are integrated into the motor 102 to meet diverse operational demands. In one embodiment, high debris nozzles designed for high debris environments effectively manage combustion residues through advanced materials and geometric designs that facilitate debris expulsion. In embodiments, elliptical nozzles provide precise control over exhaust flow, crucial for missions requiring exact orbital insertions. These elliptical nozzles manipulate thrust direction and magnitude for enhanced trajectory accuracy, making them ideal for precision-dependent launches. In one example, vector control nozzles offer dynamic thrust vector control through mechanisms that allow for in-flight adjustment of the thrust vector. This feature facilitates high maneuverability, including adjusting flight paths or making mid-course corrections. The integration of gimbal systems in said high debris nozzles and elliptical nozzles enables real-time navigation adjustments, enhancing adaptability to changing flight conditions.

In embodiments, said nozzles 106 employ materials such as carbon-carbon composites and high-grade niobium alloys, selected for their resilience under extreme thermal and mechanical stress. These materials ensure the structural integrity of the nozzle remains uncompromised, maintaining operational efficiency and safety under the rigorous conditions of rocket propulsion. In embodiments, advanced materials such as tungsten carbide and silicon carbide are utilized for their exceptional hardness and resistance to wear, making them ideal for nozzles exposed to high debris environments. These materials are less prone to erosion from high-speed particles, ensuring longer operational life and consistent performance.

In other embodiments, geometric designs like spiral grooves or fluted channels are incorporated into the interior surfaces of the nozzle. These elements act to channel and accelerate the expulsion of debris away from critical paths, minimizing accumulation and potential blockages that could impair the motor's efficiency and thrust. For example, a convergent-divergent nozzle shapes having a narrowed throat followed by a widened exit is contemplated by the present disclosure. This shape effectively accelerates the exhaust gases, which helps to eject debris particles more forcefully, reducing the likelihood of residue build-up within the nozzle's throat.

In further embodiments, zirconium diboride is utilized for its high melting points and thermal shock resistance. When integrated into the nozzle 108, this material withstands the elevated temperatures and dynamic pressure changes associated with rocket propulsion, further enhancing debris expulsion by maintaining structural integrity under extreme conditions.

Scalable Modularized Igniter

In embodiments, scalable modularized igniters 132 are disclosed that are optimized to provide versatility across a range of engine sizes and thrust needs. These igniters 132 are characterized by the ability to scale in size and power, accommodating everything from small tactical systems to large orbital launch vehicles. They may feature components such as adjustable fuel delivery systems, variable ignition timing controls, and adaptable mounting mechanisms, allowing them to fit into the herein disclosed rocket motor 102 configurations.

In further embodiments, the igniters 132 utilize a variety of ignition sources tailored to specific propellant types and mission requirements. In embodiments, ignition sources include advanced pyrotechnic compounds (e.g., triethylaluminum, triethylborane, diethylzinc, decaborane, silane, or dimethyl cadmium) which provide quick and reliable ignition. Further ignition source may include non-pyrotechnic systems such as electrical spark igniters or laser-induced ignition, which offer precise control over the ignition process. These systems are designed to operate effectively under diverse conditions, from vacuum environments to atmospheric launches.

In one example, the modular nature of these igniters is highlighted by their interchangeable components, which can be easily swapped to match the specific chemical characteristics of different propellants, from traditional solid compositions described herein to more complex hybrid or liquid propellants. This includes features such as modular igniter heads, customizable nozzle injectors, and flexible electronic control units, providing enhanced igniter adaptability and performance. Said igniters are comprise igniter materials that can withstand high temperatures and corrosive environments, such as high-performance ceramics and corrosion-resistant alloys. These igniter materials ensure the igniters' longevity and reliability, maintaining their functionality across the wide range of temperatures and pressures encountered during rocket operations. Because the igniter itself is also modular, the case length may be design shorter or longer depending on the amount of propellant needed for a particular mission design.

In some embodiments, the boss is pre-formed to include interfaces for subsequent addition of elastomeric materials such as ethylene propylene diene monomer (EPDM), silicone, or natural rubber, which enhance the sealing and mechanical connection capabilities of the boss. In other embodiments, the boss is machined to precise dimensions that are suitable for interfacing with additional modular components of the rocket motor, such as forward and aft cartridges, central combustion chambers, and polar bosses, ensuring a high degree of assembly precision and structural integrity.

In one example, a small quantity of EPDM is applied to the face of the boss to enhance the sealing properties, which is critical in maintaining the integrity and functionality of the motor under various operational conditions, including high temperature and pressure environments. In some embodiments, the curing of EPDM is performed under conditions optimized to achieve desired mechanical properties, such as elasticity and durability, which are essential for the long-term performance of the rocket motor. For example, when EPDM sheets are laid up over the dome of the boss, these sheets are layered in a manner to conform closely to the dome's curvature, facilitating a uniform thickness and coverage that enhances the structural integrity and thermal insulation of the dome. In every embodiment, the EPDM layup process is designed to minimize air gaps and ensure a contiguous bond with the underlying surfaces, which is critical for maintaining thermal insulation and mechanical strength.

In other embodiments, the use of dry fabric over the dome covered by EPDM sheets provides a composite matrix reinforcement, which is crucial for the structural enhancement of the rocket motor. For example, the fabric can be selected from a range of materials including but not limited to carbon fiber, fiberglass, or Kevlar, each offering specific tensile strength requirements that are crucial for the rocket motor's performance specifications.

In some embodiments, the application of a vacuum bag and the infusion of resin on the outer composite casing are performed under vacuum to reduce voids and enhance the mechanical properties of the casing. In other embodiments, the resin used is a thermosetting polymer, selected for its high temperature and pressure resistance, which is crucial in maintaining the structural integrity of the rocket motor during operation. In one example, the outer composite casing is cured under specified pressure and temperature, which are regulated to minimize internal stresses and distortions during the curing process. This control is essential for achieving the optimal thermal and structural properties of the casing, ensuring the rocket motor's reliability and functionality.

In some embodiments, the aft cut-off is machined to a specified length using precision cutting tools that ensure dimensional accuracy and facilitate a flush join with other rocket motor components. For example, machining involves technologies known in the art such as CNC machining or laser cutting, which provide the necessary precision for critical rocket motor components.

In some embodiments, machining a plurality of holes in the aft mating area for steel pins involves using a small drill ring tool, where 20 to 24 holes are strategically placed to facilitate epoxy bonding and mechanical interlocking. In other embodiments, the holes are designed to align precisely with corresponding features on the mating components to ensure a robust mechanical joint. For example, adding and bonding a small wedge of cured EPDM to the aft inner diameter provides an improved heat seal for the bonded and pinned joint area. In some embodiments, the EPDM wedge is specifically formulated for high temperature resistance and adhesion properties, enhancing the overall thermal management and sealing efficiency of the rocket motor.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any application.

EXAMPLES

Forward Propellant Dome Design Elements

The following details preferred embodiments of the forward cartridge (also referred to as the forward propellant dome), including disclosure related to insulation, dome material, forward cartridge resin, and other elements. Notably, the forward propellant dome is also referred to herein as the "forward cartridge", "forward dome cartridge", or "dome".

1. ID (inner diameter) insulation—EPDM—0.24 or 0.30 thickness in a preferred embodiment.
2. Dome material-Fiberglass fabric sheets are laid over uncured EPDM in a preferred embodiment. In this embodiment, EPDM sheets are laid over a mandrel, followed by fiberglass pre-preg sheets, and then they are cured afterwards. In a preferred embodiment, the resulting thickness is defined by a pre-preg sheet thickness (about 0.13-0.17 inches, or 0.15 inches in the preferred embodiment). In other embodiments, the pre-preg sheet thickness is about 0.10 inches, 0.20 inches, or 0.25 inches.
3. Forward cartridge resin—In a preferred embodiment, the forward cartridge resin of the forward propellant dome comprises vinyl ester and is manufactured using an infusion process.
4. Radial retention interface—radial tabs on the dome cartridge interface with the polar boss, resulting in a net molded "boss" with six integral radial retention tabs. In embodiments, QC8700 molding compound is used to fabricate the boss. In some embodiments, the same QC8700 is used for an igniter nozzle. Cartridge retained by polar boss—In some embodiments, radial tabs are located on the forward cartridge (e.g., dome cartridge) as shown in FIG. 4B.

5. In embodiments, the charging gap area at boss is approximately 8 in2 and is in-line with a chamber pressure transducer port.
6. In embodiments, the radial tab clearance to igniter EPDM is nominally 0.075 inch diameter or 0.037 inch radial gap "rattle space". In embodiments, this radial gap is between 0.025 inches and 0.04 inches. In embodiments, this radial gap is between. 02 inches and 0.05 inches. In addition, the igniter needs room for installation and to support transportation loads, lateral Gs etc. In other embodiments, the EPDM ID is tapered. Said dimensions extend from about 0.35 inches at the QC boss and taper to 0.20 inches or 0.24 inches at the aft edge which could allow for more duration and insulation exposure at the smaller radii and thinner under the receding propellant.
7. In embodiments, the initial axial standoff separation of propellant dome boss to case EPDM is 0.75 inches or less at boss, tapering to 0.080 inches radial clearance at the interface with the cylinder cartridge which is the current case ID to cartridge OD radial clearance. In other embodiments, said gap is smaller than 0.75 inches. In embodiments, the larger the total volume, the more heat that must be sucked out of the stagnant gas. In embodiments, a user may chamfer the boss face ID so as to not interfere with the EPDM.
8. In embodiments, attachment to main propellant cartridge OD machined area is formed with 20-24 steel pins, 0.25 inches in diameter, embedded in the epoxy-filled groove in the cylinder cartridge. In embodiments, the forward machined area does not have any holes pre-machined. In embodiments, a user can match drill or fixture drill through-holes, though the epoxy joint with the increased pin quantity is sufficient for the purpose of initial ground tests.

Exemplary Manufacturing Process

The following steps provide an exemplary manufacturing process including fabrication of the male mandrel, mold up of the boss, layup of dry fabric over the dome, and other steps.

1. Fabricate male mandrel—In embodiments, the mandrel is fabricated (e.g., the male mandrel) with hard plastic comprising the outer casing may be used if said hard plastic is adapted to withstand the cure temp of 320+F. Otherwise, aluminum may be used to fabricate the male mandrel.
2. Fabricate mold for the charge gap (also referred to herein as, "combination boss-charge passage" or "polar boss-gas passage")—In a preferred embodiment, said mold is fabricated from aluminum.
3. Mold up the boss—In a preferred embodiment QC8700 molding compound is used in the mold up of the boss with minor machining. In embodiments, the radial retention interface is formed by molding a polar boss using boss molding material (e.g., QC8700 molding compound, carbon fiber reinforced polymer (CFRP), silicon carbide (SiC), ceramic matrix composites (CMC), polyether ether ketone (PEEK), titanium alloys, Inconel alloys, phenolic resin composites, fiberglass, high-density polyethylene (HDPE), aluminum alloys, or any combination of said boss molding materials) with minor machining to form the polar boss structure, wherein the polar boss is molded into the forward polar boss enclosure.
4. Add and cure ethylene propylene diene monomer (EPDM) (add small amount to boss face) to complete the polar boss pre-mold.

5. Add boss to mandrel and layup EPDM sheets over dome.

6. Layup dry fabric over dome.

7. Applying vacuum bag and infusing resin on outer composite casing. This embodiment benefits from a decreased expense relative to comparable systems known in the art.

8. Cure the case (e.g., the outer composite casing) under pressure and temperature.

9. Machine aft cut-off to length—This step involves cutting off (e.g., skiving, trimming) the closure of the case closure of the case such that adjacent portions overlap in fitted engagement.

10. Machine a plurality of holes (e.g., 20 to 24 holes) proximate to the closure (e.g., aft mating area) for steel pins that will epoxy into the machined groove in existing propellant cartridge. In embodiments, a small drill ring tool is used for this step. In other words, a plurality of holes are made in the closure mating area for the plurality of cartridge joints that join the plurality of suspended cartridges.

11. Add and bond small wedge of cured EPDM to aft inner diameter for an improved heat seal for bonded and pinned joint area. In other words, EPDM is added to the closure inner diameter for an improved heat seal for the bonded joint area.

We claim:

1. A modular rocket motor comprising:
   a. a cylindrical composite case, the cylindrical composite case having a forward end and an aft end, the aft end having a nozzle;
   b. a plurality of cartridges suspended inside the cylindrical composite case;
   c. wherein the cartridges house a propellant;
   d. wherein the cartridges are retained co-axially with the cylindrical composite case;
   e. wherein said forward end comprises the forward cartridge, the forward cartridge comprising a radial retention interface comprising a plurality of radial tabs;
   f. wherein the aft end comprises the aft cartridge;
   g. wherein a gas gap is formed between the cartridges and the cylindrical composite case; and
   h. wherein the gas gap permits the cylindrical composite case to swell both radially and axially during ignition and burn.

2. The modular rocket motor of claim 1, wherein the radial retention interface comprises a polar boss, and a forward polar boss enclosure.

3. The modular rocket motor of claim 2, wherein the radial retention interface is formed by molding the polar boss using boss molding material.

4. The modular rocket motor of claim 2, wherein the polar boss is wound into the cylindrical composite case, allowing the cylindrical composite case to expand in response to pressure increases during ignition and burn.

5. The modular rocket motor of claim 3, wherein the boss molding material comprises a molding compound.

6. The modular rocket motor of claim 5, wherein the polar boss is centered in the cylindrical composite case.

7. The modular rocket motor of claim 3, wherein the polar boss comprises the plurality of radial tabs, the plurality of radial tabs comprising at least six radial tabs.

8. The modular rocket motor of claim 5, wherein the cylindrical composite case comprises the forward cartridge, the forward cartridge comprises a composite case material, and wherein the composite case material comprises vinyl ester.

9. The modular rocket motor of claim 5, wherein the cylindrical composite case comprises the forward cartridge, the forward cartridge comprises a composite case material, and wherein the modular rocket motor further comprises es a central joint and an aft joint.

10. The modular rocket motor of claim 9, wherein the gas gap is vented to a central combustion chamber.

11. A method of making a modular rocket motor, the modular rocket motor comprising:
   a. a cylindrical composite case, the cylindrical composite case having a forward end and an aft end, the aft end having a nozzle;
   b. a plurality of cartridges suspended inside the cylindrical composite case;
   c. wherein the cartridges house a propellant;
   d. wherein the cartridges are retained co-axially with the cylindrical composite case;
   e. wherein said forward end comprises the forward cartridge, the forward cartridge comprising a radial retention interface comprising a plurality of radial tabs;
   f. wherein the aft end comprises the aft cartridge;
   g. wherein a gas gap is formed between the cartridges and the cylindrical composite case; and
   h. wherein the gas gap permits the cylindrical composite case to swell both radially and axially during ignition and burn, the method comprising the steps of:
      a. fabricating a mandrel that supports a cure temperature of at least 300 F;
      b. fabricating a mold for a charging gap;
      c. Molding a polar boss using boss molding material with minor machining, wherein the polar boss comprises the plurality of radial tabs;
      d. Curing ethylene propylene diene monomer (EPDM) to a face of the polar boss to form a polar boss pre-mold;
      e. adding the polar boss to the mandrel and lying up EPDM sheets over a forward cartridge resin;
      f. laying up dry fabric over the forward cartridge resin; and
      g. applying a vacuum bag and infusing resin on the cylindrical composite case.

12. The method of claim 11, further comprising curing the cartridges under pressure and temperature.

13. The method of claim 12, wherein curing occurs at a temperature of at least 284 F.

14. The method of claim 13, further comprising trimming a closure of the cartridges such that adjacent cartridges overlap in fitted engagement.

15. The method of claim 14, wherein said mold comprises aluminum.

16. The method of claim 15, further comprising making a plurality of holes proximate to the closure for a plurality of joints, the plurality of joints securing the adjacent cartridges in fitted engagement.

17. The method of claim 16, wherein the plurality of joints are secured in fitted engagement with steel pins that epoxy into machined grooves of the cartridges.

18. The method of claim 17, the method further comprising adding EPDM to the closure inner diameter for an enhanced heat seal.

19. A method of making a forward cartridge of a modular rocket motor, the modular rocket motor comprising:
   a. a cylindrical composite case, the cylindrical composite case having a forward end and an aft end, the aft end having a nozzle;
   b. a plurality of cartridges, including the forward cartridge, suspended inside the cylindrical composite case;

c. wherein the cartridges house a propellant;

d. wherein the cartridges are retained co-axially with the cylindrical composite case;

e. wherein said forward end comprises the forward cartridge, the forward cartridge comprising a radial retention interface comprising a plurality of radial tabs;

f. wherein the aft end comprises the aft cartridge;

g. wherein a gas gap is formed between the cartridges and the cylindrical composite case; and h. wherein the gas gap permits the cylindrical composite case to swell both radially and axially during ignition and burn, the method comprising the steps of:

a. laying up fiberglass fabric sheet over uncured ethylene propylene diene monomer (EPDM) to form EPDM sheets;

b. laying the EPDM sheets over a mandrel;

c. laying fiberglass pre-peg sheets over the mandrel;

d. curing the pre-preg sheets, wherein the pre-preg sheets are defined by a pre-preg thickness;

e. fabricating a vinyl ester forward cartridge resin using an infusion process;

f. reinforcing the vinyl ester with a molding compound;

g. forming the radial retention interface, wherein the radial retention interface comprises a polar boss, a forward polar boss enclosure;

h. molding the polar boss using boss molding material with minor machining, wherein the polar boss is molded into the plurality of radial tabs, the plurality of radial tabs including at least six radial tabs; and i. where the plurality of radial tabs are located on the forward cartridge.

\* \* \* \* \*